United States Patent [19]

Miller

[11] 4,031,015
[45] June 21, 1977

[54] NITRILE-AMINE REACTION PRODUCTS

[75] Inventor: Clark Ober Miller, Willoughby Hills, Ohio

[73] Assignee: The Lubrizol Corporation, Cleveland, Ohio

[22] Filed: Mar. 26, 1973

[21] Appl. No.: 345,022

[52] U.S. Cl. .................................. 252/50; 252/51
[51] Int. Cl.² ......................................... C10M 1/32
[58] Field of Search ................... 252/50, 51; 44/72

[56] References Cited
UNITED STATES PATENTS

| | | | |
|---|---|---|---|
| 2,735,218 | 2/1956 | Shields et al. | 44/72 |
| 3,001,995 | 9/1961 | Frazza et al. | 252/50 X |
| 3,081,304 | 3/1963 | Rogier | 44/72 X |
| 3,139,451 | 6/1964 | Dexter et al. | 252/50 X |
| 3,326,959 | 6/1967 | Tung et al. | 252/50 X |
| 3,378,492 | 4/1968 | Song et al. | 252/50 X |
| 3,404,091 | 10/1968 | Takashima et al. | 252/50 |
| 3,785,789 | 1/1974 | Honnen et al. | 252/50 X |
| 3,953,348 | 4/1976 | Lee | 252/51 |
| 3,953,349 | 4/1976 | Lee | 252/51 |

*Primary Examiner*—Delbert E. Gantz
*Assistant Examiner*—Andrew H. Metz
*Attorney, Agent, or Firm*—James W. Adams, Jr.; Daniel N. Hall

[57] ABSTRACT

Oil-soluble compositions made by reacting an olefin or halogenated olefin of about 30 carbon atoms with an alpha, beta-unsaturated nitrile to form an organonitrile intermediate and further reacting said intermediate with a nitrogen compound such as an amine or polyamine are useful as additives for lubricants and liquid fuels. Particularly useful additives are made from alkylene polyamines.

12 Claims, No Drawings

NITRILE-AMINE REACTION PRODUCTS

BACKGROUND

1. Field of the Invention

This invention relates to additives for fuels and lubricants. More particularly it concerns additives made by first reacting an olefin or halogenated olefin with an α,β-unsaturated nitrile to form an organonitrile intermediate which is then further reacted with an amine or polyamine. This invention also relates to lubricant and liquid fuel compositions containing a minor but effective amount of these additives.

The use of additives in petroleum products such as fuels and lubricants to improve one or more performance characteristics is well known. Such characteristics as anti-corrosivity, detergency, dispersancy, oxidation resistance, load carrying capacity and the like are improved by the use of additives. Due to the increasing of severity of engine operation, the ever present desire to obtain more economical and efficient products and the emerging ecological considerations, there is a continuing and ever increasing need for improved additives which will impart desirable improved performance characteristics to lubricants and liquid fuels.

In accordance with this invention, a new class of compositions has been found which is useful as additives in the above-mentioned contexts. These products are particularly useful as ashless sludge dispersants and detergents for use in liquid fuels and lubricants which are used in internal combustion engines.

2. Prior Art

Fuel and lubricant additives made by reacting a hydrocarbon-substituted succinic acid-producing compound with an alkylene polyamine and an alkenyl cyanide are known in the prior art. See, for example, U.S. Pat. No. 3,278,550. Lubricant and fuel additives have also been prepared by grafting a vinylic monomer such as an alkenyl cyanide onto an unsaturated hydrocarbon polymer. See, for example, U.S. Pat. No. 2,965,471 and U.S. Pat. No. 3,378,492. In both of these patents, graft polymers containing unreacted nitrile groups are used directly as fuel additives without further modification. In contrast, the organonitrile of the present invention are neither graft polymers nor are they used directly as additives but rather as intermediates for the preparation of additives. It has also been reported that the condensation of alkylene diamines with organonitriles, yields glyoxalidines, J. Chem. Soc., 497 (1947).

SUMMARY OF THE INVENTION

In accordance with the present invention, oil soluble organonitrogen compositions useful as additives for lubricants and liquid fuels are made by (A) reacting (i) at least one olefin or halogenated olefin containing at least about 30 carbon atoms with (ii) at least one α,β-unsaturated nitrile to form an organonitrile intermediate and (B) further reacting said intermediate with a nitrogen compound selected from the group consisting of (i) at least one amine of the formula

wherein each R is independently hydrogen or a substantially hydrocarbyl group having up to above 30 carbon atoms; or (ii) at least one alkylene polyamine containing up to about 10 nitrogen atoms; or (iii) at least one heterocyclic amine containing at least one —NH— group, and 3 to 10 atoms in the ring and a total of about 2 to 30 carbon atoms, or (iv) mixtures of at least two of (i), (ii) or (iii).

DESCRIPTION OF THE INVENTION

In the broadest aspect of the invention, the olefin contains at least about 30 carbon atoms and can be halogenated, that is, chlorinated, brominated or iodinated. While monomeric olefins or halogenated olefins such as 3-triacontene, 6-tetracontene, 1-chlorotritracont-2-ene, 3-bromo-dotetracont-1-ene, etc., or mixtures thereof can be used, olefinic polymers or their halogenated derivatives are preferred. The halogenated olefins of this invention, whether monomeric or polymeric, contain on the average at least one atom of halogen per molecule of olefin up to an average of about one atom of halogen per 20 carbon atoms in said olefin. Thus, for example, an olefin of an average molecular weight of about 1000 would contain at least about 35.5 grams of chlorine per 1035.5 grams of chlorinated olefin. Similarly, these olefins contain, on the average, at least one olefinic linkage per molecule. Although all halogenated olefin polymers are useful, chlorinated and brominated polymers are particularly useful.

Preferably olefin polymers are those of alkenes such as monoolefins having 2 to 20 carbon atoms, particularly the homo- and interpolymers of 1-monoolefins having about 2 to 5 carbon atoms such as ethylene, propylene, 1-butene and isobutene. Polymers and interpolymers of 1-hexene, 1-octene, 2-methyl-1-heptene, 3-cyclohexyl-1-butene and 2-methyl-5-propyl-1-hexene can also be used. The olefins and halogenated olefins can also be derived from polymers of medial olefins of 2 to 20 carbons, i.e., olefins in which the olefinic linkage is not at the terminal position, such as 2-butene, 3-pentene and 4-octene.

Interpolymers, including halogenated interpolymers, of the above-described olefins with other interpolymerizable unsaturated substances such as aromatic olefins, cyclic olefins and polyenes are also useful as intermediates in this invention. Such interpolymers include, for example, those prepared by polymerizing isobutene with styrene; propene with isoprene; ethylene with piperylene; isobutene with chloroprene; isobutene with p-methylstyrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene; etc.

The relative proportions of the monoolefins to the other polymerizable monomers in the interpolymers should be such that the interpolymers are substantially aliphatic and substantially saturated, i.e., they should contain at least about 80%, preferably at least about 95%, on a weight basis of units derived from the aliphatic monoolefins and no more than about 5% of olefinic linkages based on the total number of carbon-to-carbon covalent linkages with approximately one olefinic linkage on the average per molecule.

Specific examples of such interpolymers include the copolymer of 95% (by weight) of isobutene with 5% of styrene; the terpolymer of 98% of isobutene with 1% of piperylene and 1% of chloroprene; the terpolymer of 95% of isobutene with 2% of 1-butene and 3% of 1-hexene; the terpolymer of 60% of isobutene with 20% of 1-pentene and 20% of 1-octene; the copolymer of 80% of 1-hexene and 20% of 1-heptene; the terpolymer of 90% of isobutene with 2% of cyclohexene and 8% of propene; and the copolymer of 80% of ethylene and 20% of propene.

Polymers and chlorinated polymers of butene, particularly isobutene, are especially preferred. Such polymers are conveniently obtained by polymerizing a butene such as isobutene by the use of a Friedel-Crafts polymerization catalyst such as aluminum chloride, boron trifluoride, titanium tetrachloride or the like. When commercial isobutene is used in the polymerization, the polymer may contain a small amount of polymerized units of 1-butene or 2-butene which often is present in the commercial isobutene. For the purposes of this invention, a polyisobutene may thus contain small proportions of polymerized or interpolymerized 1-butene or 2-butene.

The olefins and halogenated olefins useful herein have number average molecular weights of at least about 420, preferably about 450 and up to about 100,000. Still higher molecular weight polymers are useful and are often preferred because of their viscosity properties. Especially useful polymers are those having number average molecular weights ranging from about 700 to about 5000 such as number average molecular weights of 600, 800, 1900, 3000, etc.

The halogenated olefins are conveniently prepared by treating suitable olefins, such as those described above, with a halogenating agent such as chlorine, bromine, N-bromosuccinimide, N-iodo-phthalimide, etc. Such techniques are well-known to those of skill in this art. For example, the treatment can be carried out simply by contacting the olefin with the halogenating agent at a temperature about 50° C., preferably from about 80° C. and up to any temperature below the decomposition point of any component of the reaction mixture. The relative amounts of olefin and halogenating agent used in the treatment of such that an average of at least about one atomic proportion of halogen is incorporated into the olefinic molecules. Such amounts, in most instances, are about 1 mole of the olefin and at least about 1 mole of the halogenating agent. Halogenated olefins useful herein contain at least 1 and often 2 or more, such as 10, atomic proportions of halogen per olefin molecule, especially in instances where the olefin is of relatively high molecular weight such as 1000 or higher. In most instances, the halogen content of such halogenated olefin is from about 0.1 to 15% by weight, preferably from about 2% to about 9% of the total weight. To form the more highly halogenated polymers, of course, two or more moles of the halogenating agent are used for each mole of the olefin polymer to be halogenated.

The halogenation can be carried out in the presence of an inert solvent or diluent such as carbon tetrachloride, chloroform, chlorobenzene, benzene, etc. It is then accompanied by the formation of hydrogen halide which may simply be allowed to escape from the reaction mixture as the treatment proceeds. The precise chemical composition of the halogenated olefin polymer is not known. It is known, however, that such product may contain one or more halogen substituents per molecule and is useful as a reactant in the above process for preparing the organonitrile intermediates of this invention.

It is also possible to form a suitable halogenated polymer by interpolymerization of, e.g., isobutene, with a halogenated monomer such as chloroprene, vinyl bromide, etc., by selecting a proper ratio of non-halogenated polymerizable olefin to polymerizable halo-olefin to achieve a halogen content in the interpolymer within the limits discussed above.

The method by which the halogen is incorporated into the olefin polymer is not critical. Hence, any known method for halogenating olefins can be used and products of such methods are contemplated for use as reactants in the above process. Of course, it should be noted that halogenation of the afore-described olefins is not necessary for them to be useful in making the organonitrile intermediates of this invention.

Also, it is obvious that mixtures of halogenated and unhalogenated olefins can be used. The olefins and halogenated olefins of this invention are, with the obvious exception of the halogen substituents, substantially hydrocarbyl in nature. This means they are totally hydrocarbyl or contain groups which contain no nonhydrocarbyl substitutent which substantially effects the hydrocarbyl properties of the group relevant to its uses as described herein, such as oil solubility, oxidative stability, etc. For example, it is obvious that within the context of this invention that a purely hydrocarbyl $C_{50}$ alkenyl group and a $C_{50}$ alkyl group substituted with a methyl mercapto or a methoxyl group would not differ substantially in the properties relevant to their use in this invention, and would, in fact, appear to one of skill in the art as art-recognized equivalents. Examples of such substituents are:

Hydroxy
Ether (especially hydrocarbyloxy and particularly alkoxy groups of up to ten carbon atoms)
Amino (including mono- and di-substituted amino such as mono- and dialkylamino or mono- and diaryl amino, and the like, e.g., ethylamino, dimethylamino, diheptylamino, cyclohexylamino, and benzylamino)
Oxo
Nitro
Cyano
Thioether (especially $C_1$ to $C_{10}$ alkyl thioethers)
Sulfinyl
Sulfonyl In general, if substituents are present, there will be no more than about two such substituents for each 10 carbon atoms in the group and preferably not more than one for each 10 carbon atoms.

The α,β-unsaturated nitriles of the present invention can be either mono- or polynitriles. They normally contain from about 2 to about 30, preferably, 2 to 6, carbon atoms exclusive of those in the nitrile groups. It is a particular requirement that they contain unsaturation, either ethylenic or acetylenic, in a position alpha, beta to at least one nitrile group. In other words, the unsaturation of the carbon atom is in conjugation with the unsaturation of at least one nitrile group. It is preferable that the nitriles used as intermediates in this invention contain 2 to 30 carbon atoms per nitrile group, more preferably, 2 to 6 per nitrile group.

Mononitriles useful in this invention preferably conform to the structural formula

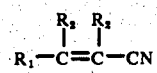

wherein $R_1$ and $R_2$ are hydrogen or substantially hydrocarbyl radicals of 1 to about 28 carbons, especially aliphatic substantially hydrocarbyl radicals. Especially useful are the vinyl cyanides in which the two $R_2$ radicals are each hydrogen or an alkyl group having up to about 12 carbon atoms and the $R_1$ radical is hydrogen or a lower alkyl group having up to about 10 carbon atoms. Examples of such vinyl cyanides include vinyl cyanide (i.e., acrylonitrile), 1-methylvinyl cyanide, 1-butylvinyl cyanide, 1-hexylvinyl cyanide, 1-cyclohexylvinyl cyanide, 1-tertiary-butylvinyl cyanide, 1-isopropylvinyl cyanide, 1-nonylvinyl cyanide, etc. Other vinyl cyanides useful herein include 2-methylvinyl cyanide (i.e., crotonic nitrile), 2-dodecylvinyl cyanide, 2,2'-didodecylvinyl cyanide, 2-cyclopentylvinyl cyanide, 2-octyl-2-methylvinyl cyanide, 2-decyl-2-hexylvinyl cyanide, and 2-tertiarypentylvinyl cyanide. Acetylenic cyanides such as propargyl cyanide, 2-cyano-1-pentyne, etc., can also be used. The discussion of "substantially hydrocarbyl" presented above with respect to the afore-described olefins applies equally to $R_1$ and $R_2$ and for the sake of brevity will not be repeated here.

The polynitriles useful in this invention contain 2 to 10, preferably 2 to 4, nitrile groups per molecule. Among them are 1,2-dicyanoethylene, 1,1-dicyanoethylene, tricyano- and tetracyanoethylene, 1,5-dicyanopent-2-ene, dihydroadiponitrile, 2-methyleneglutaronitrile, etc.

Generally these polynitriles can be represented by the generic formula

$$R_3(NC)_x$$

wherein $x$ is about 2 to 10, preferably 2 to 4, and $R_3$ is a $C_2$ to $C_{28}$ substantially hydrocarbyl group, as described above, containing at least one unsaturated linkage alpha, beta to at least one nitrile group.

While some polynitriles are available as products of commerce, others can be conveniently prepared by well-known techniques. For example, dinitriles such as $\alpha$-methylene glutaronitrile can be made by dimerization of acrylonitrile in the presence of a phosphine catalyst. Other preparative techniques are known to skilled art workers.

The organonitrile intermediates are formed by reacting at least one of the afore-described olefins or halogenated olefins with at least one of the afore-described $\alpha,\beta$-unsaturated nitriles at a temperature of about 100° C. up to the decomposition temperature of a component of the reaction mixture, generally 175° to 250° C. for a period of time sufficient for the desired chemical reaction to take place; usually 10 to 30, preferably 15 to 25 hours, depending on the quantity of reactants involved and the reaction temperature. Lower temperatures or shorter periods may be used where the $\alpha,\beta$-nitrile and/or olefin or halogenated olefin is particularly reactive.

The intermediate-forming process can be carried out with or without the presence of an inert solvent/diluent such as benzene, naphtha, toluene, xylene, chlorobenzene, dimethylformamide, dioxane and other well-known substances used for such purposes. Mineral oil is particularly useful as a solvent/diluent.

The relative amounts of reactants to be used are such that for each equivalent of olefin or halogenated olefin there is at least 0.5 to 1.5 equivalents of a $\alpha,\beta$-unsaturated nitrile. An equivalent of olefin or halogenated olefin is the molecular weight of said olefin or halogenated olefin divided by the moles of unsaturation present as determined by titration with bromine, infrared analysis, NMR analysis or other methods known to those skilled in the art. An equivalent of $\alpha,\beta$-unsaturated nitrile is similarly the molecular weight of the nitrile divided by the number of $-C \equiv N$ groups present in the nitrile.

It is often convenient, when the unsaturated nitrile is particularly reactive, to carry out the reaction of the olefin and nitrile in the presence of an inhibiting amount of a free radical polymerization inhibitor. This technique, which is well known in the art, reduces byproduct formation through polymerization of the nitrile. Such inhibitors as di(tertiary-butyl)phenol, hydroquinone, phenyl disulfide, phenothiazine, etc., can be used. The amount used will be obvious to those skilled in the art and typically will be 0.01 to 2 parts by weight per 100 parts by weight of reactant mixture.

The organonitrile intermediates of this invention can be isolated from the reaction mixture by standard techniques well known to those of skill in the art such as distillation, crystallization, decantation, filtration, etc. Alternatively, they can be further reacted in situ with one or more of the nitrogen compounds described hereinbelow. It is also possible to react all three components of the reaction mixture together, that is, the olefin, nitrile and amine described below.

Among the nitrogen compounds used in this invention are monoamines of the general formula

wherein each R is independently hydrogen, a substantially hydrocarbyl group or a hydroxy-substituted substantially hydrocarbyl group having up to about 30, preferably up to about 10 carbon atoms. Generally speaking, the substantially hydrocarbyl and hydroxy-substituted substantially hydrocarbyl groups will be aliphatic groups. The discussion of the term "substantially hydrocarbyl" presented above with regard to the olefins, etc., of this invention applies equally to the R groups. It should be noted that since each R can be hydrogen, ammonia is a "monoamine" for purposes of this invention.

The monoamines used in preparing the composition of this invention are ammonia, primary or secondary amines and each R can be independently chosen from hydrogen, aliphatic, cycloaliphatic, aromatic (including aliphatic or cycloaliphatic substituted aromatic and aromatic substituted aliphatic and cycloaliphatic) groups. Thus the amine may be, for example, ethylamine, diethylamine, n-butylamine, di-n-butylamine, isobutylamine, stearylamine, laurylmethyl amine, oleylamine, aniline, methylaniline, diphenyl amine, benzylamine, toluylamine, etc.

When R is an hydroxy-substantially hydrocarbyl group, the monoamine can be, for example, ethanolamine, di(3-propanol)amine, 4-hydroxybutyl, N-methyl-2-propanol amine, 3-hydroxyaniline, etc. Mono- and di-(hydroxy lower alkyl)amines are preferred. Particularly preferred are the lower, primary and secondary alkyl amines. In this context, the term "lower" refers to R groups containing up to 10 carbon atoms.

Polyamines can also be used in preparing the compositions of this invention. These alkylene polyamines include principally those conforming in the most part to the formula

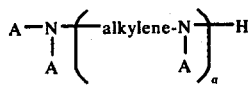

wherein a is an average of integers, preferably less than about 10. Each A is independently a hydrogen atom, a substantially hydrocarbyl group or hydroxy-substituted substantially hydrocarbyl group having up to about 30 carbon atoms. Generally, the substantially hydrocarbyl and hydroxy-substituted substantially hydrocarbyl groups are aliphatic, usually lower alkyl or hydroxy lower alkyl. Preferably, the alkylene group is a lower alkylene group having less than about 10 carbon atoms. The alkylene amines include principally methylene amines, ethylene amines, butylene amines, propylene amines, pentylene amines, hexylene amines, heptylene amines, octylene amines, etc. The higher homologs of such amines and heterocyclic amines such as piperazines and aminoalkyl-substituted piperazines are also included. These polyamines are exemplified specifically by: ethylene diamine, triethylene tetramine, propylene diamine, decamethylene diamine, octamethylene diamine, (di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methylimidazoline, 1,3-bis(2-aminoethyl)imidazoline, pyrimidine, 1-(2-aminopropyl)piperazine, 1,4-bis(2-aminoethyl)piperazine, and 2-methyl-1-(2-aminobutyl)piperazine. Higher homologues such as are obtained by condensing two or more of the above-illustrated alkylene amines likewise are useful.

The ethylene amines are especially useful. They are described in detail under the heading "Ethylene Amines" in "Encyclopedia of Chemical Technology", Kirk and Othmer, Volumn 5, pages 898–905, Interscience Publishers, New York (1950). Such compounds are prepared most conveniently by the reaction of an alkylene chloride with ammonia or by reaction of an ethylene imine with a ring-opening reagent such as water, ammonia, etc. The reaction results in the production of the somewhat complex mixtures of alkylene amines, including cyclic condensation products such as piperazines. These mixtures are particularly useful in preparing the compositions of this invention. On the other hand, quite satisfactory products can also be obtained by the use of pure alkylene amines. An especially useful mixture of alkylene amines for reasons of economy as well as effectiveness of the products derived therefrom is a commercial mixture of ethylene amines prepared by the reaction of ethylene chloride and ammonia and having an average composition which corresponds to that of tetraethylene pentamine.

Hydroxyalkyl-substituted alkylene amines, i.e., alkylene amines having one or more hydroxyalkyl substituents on the nitrogen atoms, likewise are contemplated for use herein. The hydroxyalkyl-substituted alkylene amines are preferably those in which the hydroxy alkyl group is a lower hydroxy alkyl group, i.e., having less than about 10 carbon atoms. Examples of such amines and hydroxyalkyl-substituted heterocyclic amines include N-(2-hydroxyethyl) ethylene diamine, N,N'-bis(2-hydroxyethyl)ethylene diamine, 1-(2-hydroxyethyl)piperazine, mono-hydroxypropyl-substituted diethylene triamine, 1,4-bis(2-hydroxypropyl)piperazine, di-hydroxypropyl-substituted tetraethylene pentamine, N-(3-hydroxybutyl)tetramethylene diamine, etc.

Higher homologues such as are obtained by condensation of the above-illustrated alkylene amines or hydroxy alkyl-substituted alkylene amines through amino radicals or through hydroxy radicals are likewise useful.

The heterocyclic amines which can be used in preparing the composition of this invention are those in which there is at least one >N—H group incorporated in the cycle. The cycle can also incorporate unsaturation and may be substituted with alkyl, alkenyl, aryl or alkaryl or aralkyl groups. The cycles can also contain other heteroatoms such as oxygen and sulfur or other nitrogen atoms including those having no hydrogen. Generally, these cycles have 3 to 10, preferably 5 to 6 ring members. Among such heterocycles are aziridine, azetidine, azolidine, tetra- and dihydropyridine, pyrrole, imidazole, di- and tetrahydroimidazole, piperazine, and mono and substituted piperazines, isoindol, purene, morpholine and thiomorpholine, N-aminoalkyl morpholines and N-aminoalkyl thiomorpholines, azepine, azocine, azoinine, and azecinine and tetra-, di- and perhydroderivatives of the same.

Mixtures of two or more of the above-described monoamines, alkylene polyamines and heterocyclic amines can be used to make the additives of this invention.

It is particularly preferred that the nitrogen compound have at least one primary amino group.

Generally, the afore-described nitrogen compounds are reacted with the above-described organonitrile intermediate of this invention at a temperature of 30° C. up to the decomposition temperature of the reactants or products. Preferably, the reaction takes place at a temperature of 75°–150° C. Generally, the ratio of the reactants is such that there is 0.5 to 5 equivalents of amine per equivalent of organonitrile reactant. An equivalent of amine is the molecular weight of the amine divided by the number of —NH— groups per molecule while an equivalent of organonitrile intermediate is the molecular weight of intermediate divided by the number of nitrile groups present per molecule. For example, the equivalent of ethylene diamine is one-half its molecular weight while an equivalent of an organodinitrile of average molecular weight 1000 is approximately 500.

The amino and organonitrile intermediates are reacted either in the presence or absence of a solvent/diluent. Those solvent/diluents described above for the formation of the organonitrile intermediate are similarly useful in its reaction with the amine. The reaction is carried out for a period of time sufficient for the desired reaction to occur, usually a period of about 0.1 to about 40 hours. Usually, the reaction time will be 2 to 10 hours. As is apparent to those skilled in the art, the reaction time will vary with the reaction temperature, quantity of reactants, and the specific reactants involved.

The reaction of the afore-described organonitrile intermediate with the afore-described amine can often be catalyzed by catalytic amounts of catalysts. Such inorganic acids, as sulfuric, phosphoric, nitric, hydrochloric, perchloric, etc., are useful in this context as well as organic acids such as carboxylic acids, sulfonic acids, etc. Hydrogen sulfide is a particularly useful catalyst because of its normally gaseous nature which aids in its easy removal from the reaction mixture. The amount of catalyst to be used is not critical and its selection is within the skill of those in the art. Usually, 0.05 to 20 parts catalyst per part of reaction mixture is used. Typically, when hydrogen sulfide is used, it is passed as a slow gas stream through the reaction mass. Elemental sulfur, often in the form of "flowers" of sulfur can also be used as a catalyst for this reaction and may well be converted into hydrogen sulfide in situ. Other reagents capable of conversion into hydrogen sulfide under the reaction conditions, such as thiourea, thioacetamide, etc., can also be used.

The following examples, while in no way limiting the scope of this invention, are specifically preferred embodiments of this invention. In these examples, as elsewhere in this specification and the appended claims, all parts and percentages are by weight unless otherwise specified.

EXAMPLE 1

A. To 250 parts by volume of acrylonitrile containing 0.5 part of hydroquinone as a stabilizer is slowly added seven parts of tri-n-butyl phosphine catalyst over a period of one hour. Cooling keeps the reaction mixture at 35° C. during the addition. The reaction mixture is refluxed at 80°–89° C. for 10 hours and then stabilized by addition of two parts of acetic acid. Distillation gives the desired product, 2-methyleneglutaronitrile, as a liquid, boiling at 103°–125° C./0.65–1.4 mm Hg. The NMR spectrum of this material is essentially identical with that of a reference spectrum of the desired compound.

B. A reaction mixture containing 825 parts of a polyisobutenyl chloride ($\overline{M}n$ approximately 825, 4.3% chloride), 79 parts of the 2-methyleneglutaronitrile described in 1(A) and 0.83 parts of phenothiazine as stabilizer is heated under a nitrogen atmosphere for about 3.5 hours at 120°–185° C. and then for 3 hours at 185°–210° C. After standing overnight, the reaction mixture is reheated to 150° C. and 20 parts of siliceous filter aid is added. Filtration provides the desired product as a filtrate which is characterized by a nitrogen content of 1.88 and a strong infrared absorption at 0.45 microns indicative of the nitrile group.

C. Into a reaction mixture containing 100 parts of the organonitrile described in 1(B), and 10.9 parts of a commercial polyethylene amine mixture having a nitrogen content of 33.8% by weight and an average composition corresponding to pentaethylene hexamine is slowly introduced over approximately 5 minutes while gaseous hydrogen sulfide is slowly bubbled into the mixture until a total of 1.4 parts has been added. The mixture is held at 90° C. during the addition. The temperature is maintained at 90°–120° C. for 4 hours and is then heated to 140°–150° C. with nitrogen blowing for 5 hours. Diluent oil (110 parts) is then added and the reaction mass filtered through filter aid at 120° C. to provide an oil solution of the desired product which is characterized by a nitrogen content of 1.60% and infrared absorptions at 3.12µ(NH) and 4.42 (C≡N), weak.

EXAMPLE 2

A. A reaction mixture of 4125 parts of the chlorinated polyisobutene, described in 1(B), 530 parts of 2-methylglutaronitrile and 4.1 parts of phenothiazine is reacted in essentially the same manner as described in 1(B), to provide the desired organonitrile intermediate. This intermediate has a nitrogen content of 3.07% and exhibits infrared absorptions at 4.47 and 4.48 microns indicative of the presence of nitrile groups.

B. A mixture of 3700 parts of the organonitrile described in 2(A) and 675 parts of the commercial polyethylene polyamine mixture described in 1(C) is heated to 95° C. Gaseous hydrogen sulfide is introduced into the reaction mass according to the following schedule:

i. 10 parts of hydrogen sulfide is added over a 0.5 hour period while the reaction mixture is held at 95°–103° C;

ii. 10 parts of hydrogen sulfide is added over a 0.5 hour period while the reaction temperature is held at 103° C.

The mixture is then heated at 103°–145° C. for 3 hours and stored overnight at room temperature.

It is again heated to 130°–170° C. for 6 hours while being blown continuously with nitrogen. Diluent oil is added to the mixture and it is heated for an additional 3 hours at 120°–170° C. with nitrogen blowing. Filtration at 150° C. provides a solution of final reaction product as a filtrate. This filtrate is characterized by a nitrogen content of 3.12%.

C. The filtrate described in 2(B) (446 parts) is washed with two 400 parts by volume portions of water and then extracted with a mixture of 500 parts textile spirits, 300 parts normal butyl alcohol and 100 parts methanol (all by volume). The organic layer is washed once with water and stripped to a final temperature of 180° C. at 15 mm Hg. Filtration through 10 parts of filter aid provides as a filtrate, a clear oil solution of the final product. This solution is characterized by a nitrogen content of 2.4% and an infrared spectrum lacking absorptions characteristic of the nitrile group.

EXAMPLE 3

To a stirred reaction mass comprising 172 parts of the organonitrile described in 2(A) at 90° C. is slowly added 28 parts of a commercial mixture of ethylene polyamines having an average nitrogen content of 36.1% by weight and an average composition corresponding essentially to triethylene tetramine. Then 4 parts of gaseous hydrogen sulfide is introduced into the stirred mixture over the next 5 hours. The mixture is held at 80°–120° C. for 5 hours and then 200 parts of diluent oil is added. It is then heated to 120°–150° C. and blown with nitrogen. Filtration through siliceous filter aid gives as a filtrate, an oil solution of the desired product. This solution is characterized by a nitrogen content of 2.39% and a substantial lack in its infrared spectrum of any bands characteristic of the nitrile group.

EXAMPLE 4

To 456 parts of the organonitrile described in 2(A) and 200 parts of diluent oil is slowly added 210 parts of di-n-butyl amine over a period of one hour at a temperature of 50°–60° C. Gaseous hydrogen sulfide is slowly passed through the stirred reaction mixture while it is heated to a temperature of 60°–80° C. for a 3 hour period. The reaction mixture is nitrogen blown for 2 hours at 60°–80° C. and then filtered through filter aid to provide an oil solution of the desired product.

EXAMPLE 5

Example 5 is carried out in essentially the same manner as Example 4 except that 228 parts of the organonitrile of Example 2(A) is reacted with 72 parts of piperazine. The desired product is obtained by filtration as an oil solution.

EXAMPLE 6

A. A reaction mixture comprising 825 parts of the polyisobutenyl chloride described in 1(B), 78 parts of vinylidene dinitrile and 0.85 parts of phenothiazine is heated for 6 hours at a temperature of 150°–185° C. under a nitrogen atmosphere. The reaction mixture is then filtered at a temperature of 120° C. through siliceous filter aid to give the desired organodinitrile intermediate.

B. To 868 parts of the organonitrile dinitrile described in 6(A) is slowly added 103 parts of diethylene tetramine. The addition requires 2 hours at 50° C. while the reaction mixture is held under a nitrogen atmosphere. A diluent oil (400 parts) is added and the reaction mixture is heated at 120°–150° C. for 2 hours and then nitrogen blown for an additional 2 hours at this temperature. Filtration through filter aid provides the desired product as a clear oil solution.

EXAMPLE 7

To 430 parts of the organodinitrile described in Example 6(A) in 500 parts of diluent oil at 50°–60° C. is slowly added 95 parts of aniline over a 2 hour period. The reaction mixture is then heated at 120°–150° C. while gaseous hydrogen sulfide is slowly passed through it for an additional 2 hours. Filtration through filter aid provides an oil solution of the desired product.

EXAMPLE 8

A. 825 parts of the polyisobutenyl chloride described in Example 1(B) is reacted with 120 parts of tetracyanoethylene in a manner essentially similar to that used to prepare the organodinitrile intermediate described in Example 6(A).

B. To a solution of 500 parts of the organo polynitrile described in Example 8(A) in 500 parts of diluent oil is added gaseous ammonia over a 6 hour period. The reaction vessel is equipped with a Dewar condenser cooled with dry ice so as to reflux the ammonia. The reaction mixture contains 0.3 part of 10 normal sulfuric acid as a catalyst. The reaction mixture is stirred at room temperature for 28 hours during which time aliquots are removed at 2 hour intervals and analyzed by infrared spectroscopy. At the end of the reaction, infrared analysis shows the substantial absence of any nitrile groups in the reaction product. The reaction is then blown with nitrogen for 2 hours at room temperature and filtered through siliceous filter aid to give an oil solution of the desired product.

EXAMPLE 9

A. To 930 parts of polyisobutenyl chloride (Mn approximately 900, content 8.43%) at 190°–200° C., is slowly added, in batches, a total of 291 parts of acrylonitrile. During the first 5.75 hour period of addition, 117 parts of acrylonitrile is added. During the second 7.3 hour addition period, 100 parts of acrylonitrile is added. During the final 6.6 hour period, 74 parts of acrylonitrile is added. At the end of this addition, 71.6% of the theoretical amount of acidic gases is collected and neutralized by an alkaline water trap attached to the reactor. The crude product is filtered through filter aid to give, as a filtrate, the desired organonitrile intermediate.

B. To a mixture of 300 parts of the organonitrile prepared in 9(A) and 200 parts of xylene and 2.1 parts of sulfur flowers at a temperature of 150° C. is slowly added 71 parts of a commercial mixture of ethylene polyamines having an average nitrogen content of about 33.5% by weight and an average composition corresponding essentially to tetraethylene pentamine. The addition takes place over a period of 1 hour while the reaction mixture is nitrogen blown. The mixture is then heated at a temperature of 150°–160° C. for an additional 15.6 hours. Small amounts of sulfur flowers are added to the reaction mixture periodically as a catalyst. At the end of the heating period, 65 parts of zinc dust is added to the reaction mixture and it is heated to 150°–160° C. for 4 hours to convert any excess sulfur catalyst to zinc sulfide which is more easily removed by filtration. The reaction mixture is filtered through filter aid to yield a xylene solution of the final product which is then stripped at 180° C./10–20 mm Hg to produce the desired product.

EXAMPLE 10

A. To 6347 parts of polyisobutenyl chloride ($\overline{Mn}$ approximately 800, chlorine content 4.45%) at 130°–215° C. is slowly added 650 parts of acrylonitrile (water content 0.5%). The addition takes place over a 24 hour period and it is rate adjusted so that there is a slow distillation of acrylonitrile from the reaction mixture. Provision is made to recycle the distilled acrylonitrile.

The reaction mixture is then stripped at 175° C./15 mm Hg for 3 hours to give the desired intermediate as an oily residue characterized by a nitrogen content of 1.29% and a chlorine content of 0.12%.

B. To 1086 parts of the organonitrile intermediate described in 10(A) is slowly added at 100° C., 73 parts of a commercial mixture of polyethylene amines having an average nitrogen content of about 36.1% by weight and having an average composition corresponding essentially to that of triethylene tetramine. The reaction mixture is heated to 100° C. while gaseous hydrogen sulfide is bubbled through for a period of 16 hours. The mixture is then heated to 175° C. and blown with nitrogen for an additional 3 hours. A volume of toluene approximately equal to that of the reaction mixture and 750 parts by volume of methanol are added to the reaction mixture which upon standing separates into 2 layers. The methanolic layer is discarded and the other layer washed with an additional 750 parts by volume of methanol. The toluene layer is then separated and stripped at 200° C. with nitrogen blowing. The residue is the desired product.

EXAMPLE 11

A mixture of 300 parts of the organonitrile intermediate described in 10(A), 300 parts of xylene, and 100 parts of n-butyl amine is heated to 98° C. with nitrogen blowing. One part of sulfur flowers is added as catalyst. The reaction mixture is heated with nitrogen blowing for a total of 19.8 hours and then stripped under pressure of 15 mm Hg to 110° C. to provide the final product as an oily residue.

EXAMPLE 12

A. To 950 parts of a polyisobutenyl bromide containing 8.2% bromine (made by bromination with n-bromosuccinimide of a polyisobutene of $\overline{M}n$ 960) containing one part of phenothiazine is slowly added 150 parts of α-methyl acrylonitrile. The addition is carried out at 190°–200° C. over 2 hours. The reaction mixture is then heated for a total of 16 hours at 200°–220° C. with provision made for trapping of acidic vapors. After 80% of the theoretical amount of acidic vapors is trapped, the reaction mixture is blown with nitrogen for a period of 2 hours at 150°–160° C. and then filtered through filter aid to give the desired organonitrile intermediate as a filtrate.

B. To 750 parts of the intermediate described in 12(A) in an equal volume of toluene is slowly added 200 parts morpholine. The addition is carried out at a temperature of 140°–160° C. over 2 hours. The reaction mixture is then heated for a period of 8 hours at 160°–175° C. while hydrogen sulfide is slowly bubbled through it. After being nitrogen blown for 2 hours at 170°–180° C. the reaction mixture is stripped at 110°–120° C./10 mm Hg and filtered through siliceous filter aid to give the desired final product as a viscous filtrate.

EXAMPLE 13

A. To 824 grams of polyisobutenyl chloride ($\overline{M}n$ approximately 825, 4.3% chlorine) a reaction vessel equipped with a nitrogen stirrer is slowly added over a period of 20.25 hours, 177 grams of acrylonitrile. The reaction vessel is equipped so that the acrylonitrile refluxes, the noncondensable gases pass through an aqueous sodium hydroxide trap and the reaction mixture mass is kept at a 180°–225° C. At the end of the reaction period, 65% of the theoretical amount of sodium hydroxide in the trap is neutralized by acidic effluent. The reaction mass is then filtered through a filter aid at 100°–125° C. to give the final product as a filtrate.

B. To a mixture of 200 grams of the reaction intermediate described in (A), in 100 parts of xylene and 0.5 part of sulfur flowers is added 30 parts of a commercial mixture of ethylene polyamine having an average nitrogen content of about 33.5% and an average composition corresponding essentially to tetraethylene pentamine. The reaction mixture is heated under nitrogen to 130°–135° C. for 20.5 hours. Additional 0.5 part of sulfur are added to the reaction mixture periodically until a total of 3 parts is added. At the end of the reaction mixture 15 parts of zinc is added to react with any excess elemental sulfur. The crude reaction mixture is filtered through a filter aid and stripped at 130° C./2 mm Hg to give the final product as residue which is characterized by a nitrogen content of 1.05–1.09.

The following preparations are carried out in essentially the same manner as Examples 1B and 1C. In each case, two equivalents of amine per equivalent of nitrile group and one equivalent of α,β-unsaturated nitrile per equivalent of unsaturation in the olefin are used. Diluent oil, in a volume equal to that of the reaction mixture, is added before filtration.

TABLE

| Example | Olefin | Nitrile | Amine |
|---|---|---|---|
| 14 | 1-Tetratriacontane | Acrylo-nitrile | a |
| 15 | Polyisobutylene (Mn 800) | 2-Methylene glutaro-nitrile | b |
| 16 | Polypropylene (Mn 500) | Acrylo-nitrile | a |
| 17 | Chloropoly-isobutylene[c] | Acrylo-nitrile | Aniline |
| 18 | 1-Pentacontene[d] | 3-Cyano-1-butene | Di(n-butyl)amine |
| 19 | Chloropoly-isobutylene[c] | 3-Cyano-1-heneicosene | a |
| 20 | 3-Bromo-1-pentacontene[e] | Acrylo-nitrile | b |
| 21 | Ethylene-propylene copolymer[f] | Acrylo-nitrile | a |

[a] the polyamine described in Example 1(C)
[b] the polyamine described in Example 2(A)
[c] the chlorinated olefin described in Example 1(B)
[d] a commercial mixture of α-olefins averaging this composition
[e] made by bromination of (d) with N-bromosuccinamide
[f] 50/50 molar ratio, Mn 3500, 1.2 mole unsaturation per mole

EXAMPLE 22

A mixture of 800 parts of the chloropolyisobutene described in Example 1(B), 2.0 parts of phenothiazine inhibitor, 88 parts of the polyamine described in Example 1(C) and 300 parts of 3-cyano-1-heneicosene are heated under reflux for 36 hours with provision made for trapping of the acidic off-gases. An equal volume of diluent oil is then added and the mixture filtered to give the desired product.

The fuel compositions of the present invention contain a major proportion of a normally liquid hydrocarbon fuel, especially petroleum distillate fuels, such as an aviation or motor gasoline, diesel fuel or fuel oil as defined by ASTM Specification D-396. Particularly preferred is gasoline, that is, a mixture of hydrocarbons having an ASTM boiling point of about 60° C. at the 10% distillation point to about 205° C. at the 90% distillation point. Such gasolines are further described in ASTM Specification D-439-68T.

Generally, these fuel compositions contain a sludge-dispersing and carburetor-deposit inhibiting amount of the reaction products of this invention; usually this amount is 1 to 10,000, preferably 4 to 1000 parts by weight of the reaction product per million parts by weight of fuel.

As previously indicated, the reaction products of this invention are useful as additives in preparing lubricant compositions. They can be employed in a variety of lubricant compositions based on diverse oils of lubricating viscosity, including natural and synthetic lubricating oils and mixtures thereof. These lubricant compositions include crankcase lubricating oils for spark-ignited and compression-ignited internal combustion engines including automobile and truck engines, two-cycle engine lubricants, aviation piston engines, marine and railroad diesel engines and the like. However, automatic transmission fluids, transaxle lubricants, gear lubricants, metal-working lubricants, hydraulic fluids and other lubricating oil and grease compositions can also benefit from the incorporation therein of the present reaction products.

Natural oils include animal oils and vegetable oils (e.g., castor oil, lard oil) as well as liquid petroleum oils and solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecylbenzenes, tetradecylbenzenes, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ehtylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol.

Another suitable class of synthetic lubricating oils comprises the esters of dicarboxylic acids (e.g, phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, ethylene glycol, etc.). Specific examples of these esters include dibutyl adipate, di(2-ethylhexyl) sebacate, di-n-hexyl fumarate, dioctyl sebacate, dissooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as trimethylol propane, pentaerythritol, dipentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-2-tetraethyl)silicate, tetra-(p-tert-butylphenyl)silicate, hexyl-(4-methyl-2-pentoxy)-disiloxane, poly(methyl)siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Generally, the lubricant compositions of the present invention contain a sludge dispersing amount of the reaction products of this invention. Often this amount will be 0.05 to 20, preferably 1 to 10% of the lubricant composition.

The fuel compositions of this invention can contain in addition to the above-described additives, other additives which are well-known to those of skill in the art. These can include anti-knock agents such as tetraalkyl lead compounds, lead scavengers such as haloalkanes, deposit preventers or modifiers such as triaryl phosphates, dyes, anti-oxidants such as 2,6-di-tertiary butyl-4-methylphenol, rust inhibitors, such as alkylated succinic acids and anhydrides, bacteriostatic agents, gum inhibitors, metal deactivators, upper cylinder lubricants and the like.

The lubricant compositions of the present invention can contain other additives that are normally used in lubricants. Such additives include, for example, detergents of the ash-forming and of the ashless type, viscosity index improving agents, pour-point depressants, anti-foam agents, extreme pressure agents, rust-inhibiting agents, oxidation and corrosion inhibiting agents.

In a preferred embodiment of the present invention, the afore-described additive reaction products are combined with an ashless dispersant which is an ester of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645, British Pat. Nos. 981,850 and 1,055,337 and U.S. Pat. Nos. 3,255,108; 3,311,558; 3,331,776 and 3,346,354. Generally, the weight ratio of the reaction products of this invention to the aforesaid ashless dispersants is about 0.1 to 10.0, preferably 0.1 to 10 parts of reaction product to 1 parts ashless dispersant. Preferred weight ratios are between 0.5 to 2.0 parts reaction product to 1 part dispersant.

In still another embodiment of this invention, the additives of this invention are combined with ashless dispersants of the type formed by reacting halogenated polymers with polyalkylene polyamines. Such dispersants are described in U.S. Pat. Nos. 3,573,010; 3,574,576; 3,438,757; 3,565,804 and 3,565,492.

The reaction products of this invention can be added directly to the fuel or lubricant to be treated or they can be diluted with an inert solvent/diluent such as mineral oil to form an additive concentrate. These concentrates generally contain 10 to 90 percent reaction product and can contain in addition any of the above-described prior art additives, particularly the afore-described ashless dispersants in the aforesaid proportions.

The fuel compositions of this invention are exemplified by the following:

EXAMPLE 13

A gasoline having a Reid vapor pressure of 10.5 psi and containing 2.5 grams of lead per gallon and 100 parts per million parts of gasoline of the reaction product described in Example 1(C).

EXAMPLE 14

A No. 2 fuel oil containing 200 parts per million parts of fuel of the reaction product described in Example 3.

EXAMPLE 15

A gasoline having a Reid vapor pressure of 15 psi and containing 2.1 grams per gallon of tetraethyl lead and 15 parts per million parts of gasoline of the reaction product of Example 9(B).

Lubricant compositions of the present invention are exemplified by the following:

EXAMPLE 16

A solvent-refined, neutral SAE 10 mineral oil containing 1.5% of the reaction product described in Example 2(B).

EXAMPLE 17

A synthetic lubricant comprised predominantly of $C_5$ to $C_9$ normal alcohol esters of a 50/50 molar mixture of adipic and glutaric acids containing 2.5% of the reaction product described in Example 4.

EXAMPLE 18

A solvent-refined paraffinic mineral oil having a viscosity at 40° C. of 175 SUS containing 2.5% tricresyl phosphate and 2.5% of the reaction product described in Example 6(B).

The lubricant and liquid fuel compositions of this invention and the reaction products and the processes for preparing these products have been specifically set forth above to aid those skilled in the art to understand and practice the invention. Many obvious variations and departures from the specific disclosure will be apparent to those of skill in the art based on principles and teachings herein and in the prior art. Such variations and departures are contemplated as being within the scope of the present invention as identified in the appended claims.

What is claimed is:

1. A lubricant composition comprising a major amount of a lubricating oil and a minor but sludge dispersing amount of at least one organonitrogen composition made by
   A. reacting (i) one equivalent of one olefin or halogenated olefin containing at least about 30 carbon atoms with 0.5 to 1.5 equivalents of (ii) at least one $\alpha,\beta$-unsaturated nitrile of the formula

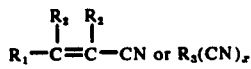

wherein $R_1$ and $R_2$ are hydrogen or substantially hydrocarbyl radicals of 1 to about 28 carbons, $R_3$ is a $C_2$ to $C_{28}$ substantially hydrocarbyl group containing at least one unsaturated linkage alpha, beta to at least one nitrile group and $x$ is 2 to about 10 at a temperature of about 100° C up to the decomposition temperature of a component of the reaction mixture to form an organonitrile intermediate and
   B. further reacting at a temperature of 30° C up to the decomposition point of the reactants or the products an equivalent of said intermediate with about 0.5 to 5 equivalents of a nitrogen compound chosen from the group contisting of (i) at least one amine of the formula

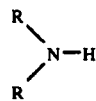

wherein each R is independently hydrogen, a substantial hydrocarbyl group or a hydroxyl-substituted substantial hydrocarbyl group having up to about 30 carbon atoms; (ii) at least one alkylene polyamine containing up to about 10 nitrogen atoms; (iii) at least one heterocyclic amine containing at least one -NH- group incorporated in the cycle, 3 to 10 atoms in the cycle and a total of about 2 to 30 carbon atoms; and (iv) mixtures of at least two of (i), (ii) or (iii).

2. A lubricant composition as claimed in claim 1, wherein the olefin or halogenated olefin is a polymeric olefin derived from polymerization of at least one monoolefin having about 2 to 5 carbon atoms, said polymer having a number average molecular weight of about 420 to 100,000.

3. A lubricant composition as claimed in claim 1 wherein at least one chlorinated or brominated olefin is reacted with said $\alpha,\beta$-unsaturated nitrile.

4. A lubricant composition as claimed in claim 1 wherein the olefin or halogenated olefin is a polyisobutene or halogenated polyisobutene having a number average molecular weight of about 420 to 100,000.

5. A lubricant composition as claimed in claim 1 wherein the organo-nitrogen composition is made by the process comprising
   A. reacting (i) at least one chlorinated olefinic polymer containing about 2 to 9% chlorine and having a number average molecular weight of about 700 to about 5000 with (ii) at least one $\alpha,\beta$-unsaturated nitrile having 2 to 6 carbon atoms exclusive of the carbon atoms in the nitrile groups to form an organo-nitrile intermediate and
   B. further reacting said intermediate with an alkylene polyamine containing 2 to 10 nitrogen atoms of the general formula

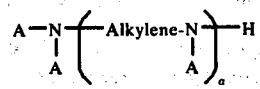

wherein $a$ is an integer preferably less than about 10, each A being independently a hydrogen atoms, a substantially hydrocarbyl group or hydroxy-substituted substantially hydrocarbyl group having up to about 30 carbon atoms.

6. A lubricant composition as claimed in claim 5, wherein the reaction of the chlorinated olefinic polymer with a nitrile takes place in the presence of a free radical polymerization inhibitor in inhibiting amounts and the reaction of the intermediate takes place in the presence of catalytic amounts of an acidic catalyst, said catalyst being an inorganic protonic acid or an organic carboxylic or sulfonic acid.

7. A fuel composition comprising a major amount of a normally liquid fuel and a minor but corrosion inhibiting amount of at least one organonitrogen composition made by the process comprising
   A. reacting (i) one equivalent of at least one olefin or halogenated olefin containing at least about 30 carbon atoms with 0.5 to 1.5 equivalents of (ii) at least one $\alpha,\beta$-unsaturated nitril of the formula

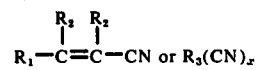

wherein $R_1$ to $R_2$ are hydrogen or substantially hydrocarbyl radicals of 1 to about 28 carbons, $R_3$ is a $C_2$ to $C_{28}$ substantially hydrocarbyl group containing at least one unsaturated linkage alpha, beta to at least one nitrile group and $x$ is 2 to about 10, at a temperature of about 100° C up to the decomposition temperature of a component of the reaction mixture of form an organonitrile intermediate and
   B. further reacting at a temperature of 30° C up to the decomposition point of the reactants or the products an equivalent of said intermediate with 0.5 to 5 equivalents of a nitrogen compound chosen from the group consisting of (i) at least one amine of the formula

wherein each R is independently hydrogen, a substantially hydrocabyl group or a hydroxyl-substituted substantially hydrocarbyl group having up to about 30 carbon atoms; (ii) at least one alkylene polyamine containing up to about 10 nitrogen atoms; (iii) at least one heterocyclic amine containing at least one —NH— group incorporated in the cycle, 3 to 10 atoms in the ring and a total of about 2 to 30 carbon atoms; and (iv) mixtures of at least two of (i), (ii), or (iii).

8. A fuel composition as claimed in claim 7, wherein the olefin or halogenated olefin is a polymeric olefin derived from polymerization of at least one monoolefin having about 2 to 5 carbon atoms, said polymer having a number average molecular weight of about 420 to 100,000.

9. A fuel composition as claimed in claim 7 wherein at least one chlorinated or brominated olefin is reacted with said α,β-unsaturated nitrile.

10. A fuel composition as claimed in claim 7 wherein the olefin or halogenated olefin is a polyisobutene or halogenated polyisobutene having a number average molecular weight of about 420 to 100,000.

11. A fuel composition as claimed in claim 7 wherein the organo-nitrogen composition is made by the process comprising
A. reacting (i) at least one chlorinated olefinic polymer containing about 2 to 9% chlorine and having a number average molecular weight of about 700 to about 5000 with (ii) at least one α,β-unsaturated nitrile having 2 to 6 carbon atoms exclusive of the carbon atoms in the nitrile groups to form an organo-nitrile intermediate and
B. further reacting said intermediate with an alkylene polyamine containing 2 to 10 nitrogen atoms of the general formula

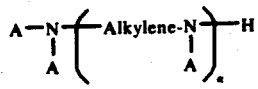

wherein $a$ is an integer preferably less than about 10, each A being independently a hydrogen atom, a substantially hydrocarbyl group of hydroxy-substituted substantially hydrocarbyl group having up to about 30 carbon atoms.

12. A composition as claimed in claim 11, wherein the reaction of the chlorinated olefinic polymer with a nitrile takes place in the presence of a free radical polymerization inhibitor in inhibiting amounts and the reaction of the intermediate takes place in the presence of catalytic amounts of an acidic catalyst, said catalyst being an inorganic protonic acid or an organic carboxylic or sulfonic acid.

* * * * *

UNITED STATES PATENT OFFICE
CERTIFICATE OF CORRECTION

Patent No. 4,031,015  Dated June 21, 1977

Inventor(s) Clark Ober Miller  Page 1 of 2

It is certified that error appears in the above-identified patent and that said Letters Patent are hereby corrected as shown below:

At column 17, line 26, that is Claim 1, line 2, "lubric ting" should be -- lubricating --.

At column 17, lines 57 and 58, that is Claim 1, lines 26 and 27, "substantial" should be -- substantially --.

At column 17, lines 58 and 59, that is Claim 1, lines 27 and 28, "substantial" should be -- substantially --.

At column 18, line 32, that is Claim 5, line 16, "atoms" should be -- atom --.

At column 18, line 50, that is Claim 7, line 8, "nitril" should be -- nitrile --.

At column 18, line 56, that is Claim 7, line 10, "$R_1$ to $R_2$" should be -- $R_1$ and $R_2$ --.

UNITED STATES PATENT OFFICE
CERTIFICATE OF CORRECTION

Patent No. 4,031,015      Dated June 21, 1977

Inventor(s) Clark Ober Miller      Page 2 of 2

It is certified that error appears in the above-identified patent and that said Letters Patent are hereby corrected as shown below:

At column 18, line 63, that is Claim 7, line 17, "mixture of" should be -- mixture to --.

At column 20, line 22, that is Claim 11, line 17, "group of" should be -- group or --.

Signed and Sealed this

Third Day of January 1978

[SEAL]

Attest:

RUTH C. MASON      LUTRELLE F. PARKER
Attesting Officer      Acting Commissioner of Patents and Trademarks